July 8, 1958
F. B. PFEIFFER
2,841,820
STRETCHING MEANS
Original Filed Feb. 3, 1954
3 Sheets-Sheet 1
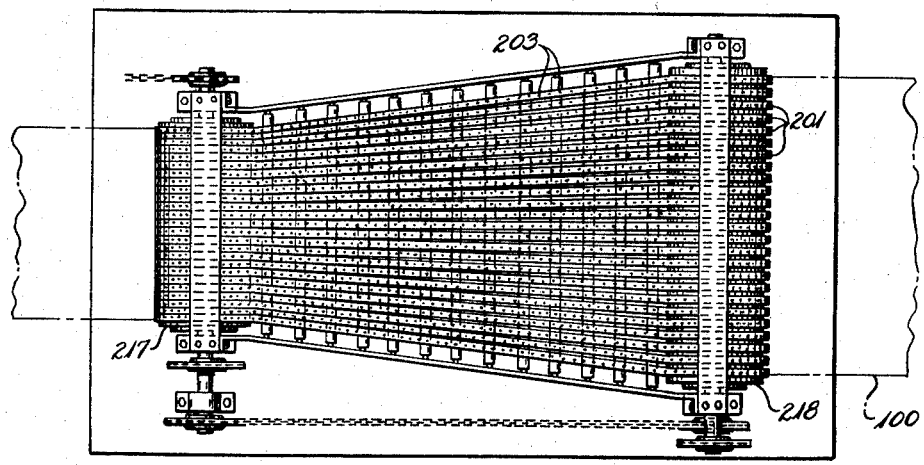
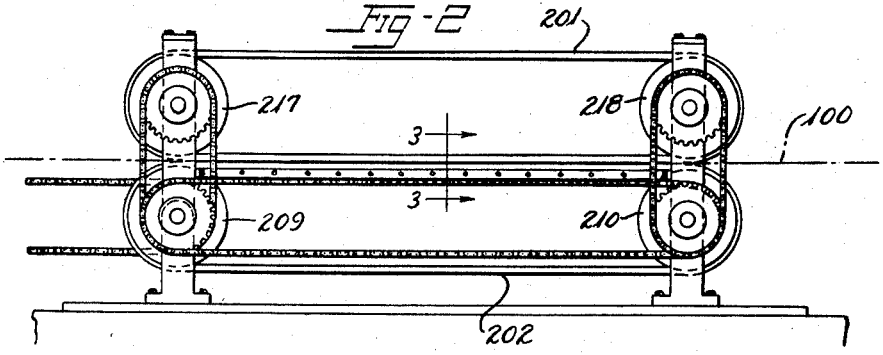
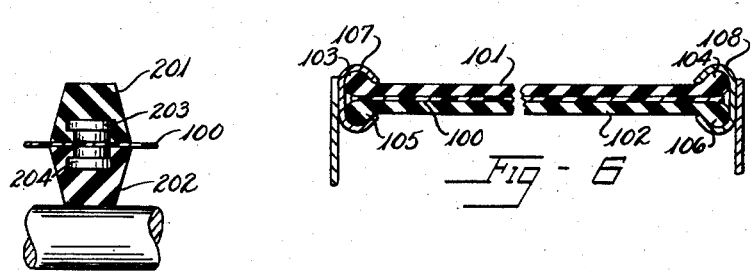
INVENTOR.
FRED B. PFEIFFER
BY
ATTY.

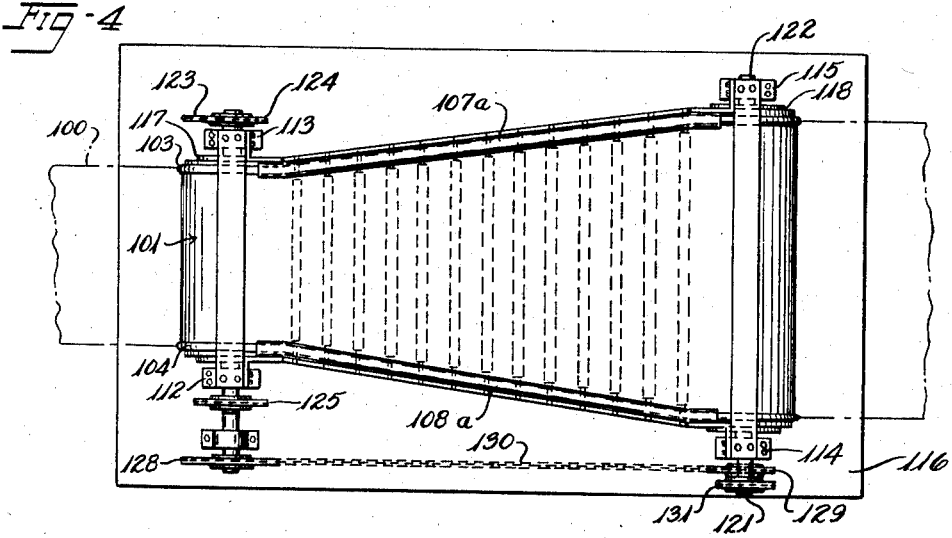
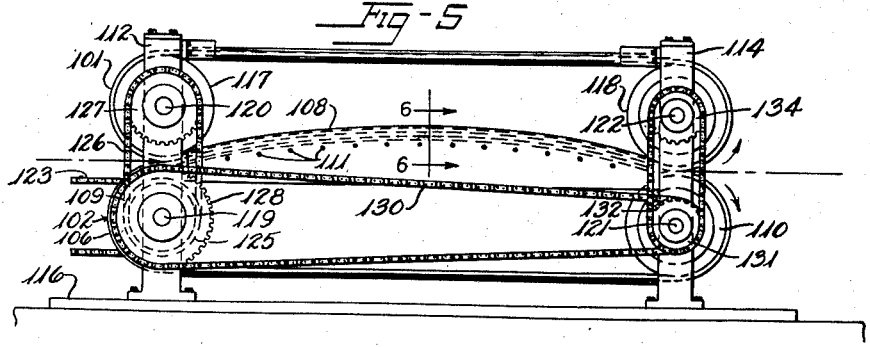

July 8, 1958 F. B. PFEIFFER 2,841,820
STRETCHING MEANS

Original Filed Feb. 3, 1954 3 Sheets-Sheet 3

INVENTOR.
FRED B-PFEIFFER
BY

ATY

United States Patent Office 2,841,820
Patented July 8, 1958

2,841,820

STRETCHING MEANS

Fred B. Pfeiffer, Akron, Ohio, assignor of one-half to Jesse R. Crossan, Wadsworth, Ohio Original application February 3, 1954, Serial No. 407,900, now Patent No. 2,769,022, dated October 30, 1956. Divided and this application January 13, 1955, Serial No. 485,564

7 Claims. (Cl. 18—1)

This invention relates to conveying stretching and crowding. One embodiment of the invention comprises an endless conveyor belt-like means that simultaneously increases and decreases the speed of its travel in opposite directions respectively, and simultaneously widens and narrows in different portions of the same belt.

Before the present invention, methods and apparatus for stretching films of rubber hydrochloride and the like have been developed as will be seen by reference to United States patents, R. C. Martin No. 2,328,827; H. D. Minch Nos. 2,307,056 and 2,334,022. In Patent No. 2,334,022, page 2, column 2, lines 15 to 25 it is stated that the film may be stretched laterally and that it may be possible to stretch it longitudinally and laterally at the same time, however, neither the specifications nor drawing of this latter patent describes or shows means for or discloses the disadvantages of such simultaneous two-way stretch.

So far as applicant has been able to learn the prior art methods and apparatus, for stretching sheets of heat softened rubber hydrochloride or other thermostretchable elastoplastic sheets, whether for orienting the material or to increase the surface area thereof, has not been completely satisfactory principally because such stretching has been done entirely from the edges in the width wide stretching. These films adapted for packaging are usually about .001" in thickness and whether cast or calendered, their thickness varies, and probably due to lack of uniform dispersion of plasticisers, the film has areas more easily stretched than other areas. When the stretching force is applied at the edge of the sheet or strip, or across a substantial distance of film in any direction these thin and soft spots are stretched an objectionable amount while the thicker and the harder areas are not stretched as much as is desirable resulting in an extremely non-uniform sheet. Applicant's method employs stretching means, which means is itself stretchable and in direct contact with the surface of the portion of the film being stretched or wrinkled as the case may be.

An object of the present invention is to provide means for increasing the surface area by simultaneously stretching sheets of stretchable material in all directions in such manner that thin, soft, weak or tough portions of the sheet is subjected to the same uniform amount of stretch.

Another object of the invention is to simultaneously wrinkle, in all directions, a relatively thin sheet of material.

Another object of the present invention is to convert a thin smooth sheet or strip of rubber hydrochloride, hydrobromide or the like, into an oriented sheet with its surface having numerous wrinkles extending in all directions and being adapted to enclose an object to be packaged by being drawn snugly thereabout straightening out at least some of said wrinkles, and if desired, next subjecting the film to heat to cause the film to shrink, removing additional wrinkles and to cause the film to fit smoothly about said object.

In the accompanying drawings which are more or less diagrammatic:

Fig. 1 is a plan view of one embodiment of the invention adapted to convey and stretch and wrinkle a sheet of material;

Fig. 2 is a side elevation of the apparatus of Fig. 1;

Fig. 3 is an enlarged fragmentary sectional view taken on line 3—3 of Fig. 2;

Fig. 4 is a plan view of another embodiment of the invention adapted for conveying and stretching and wrinkling sheet material;

Fig. 5 is a side elevation of the apparatus of Fig. 4;

Fig. 6 is a sectional view taken on line 6—6 of Fig. 5;

Figure 7:
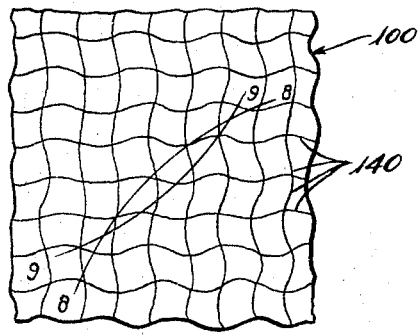
Fig. 7 is an enlarged plan view of a small area of the film of Fig. 2 shown after the film has been stretched in the apparatus of Figs. 1 and 2 cooled and wrinkled by running the unstretched film through the apparatus of Fig. 2 in reverse direction.
Figure 8:
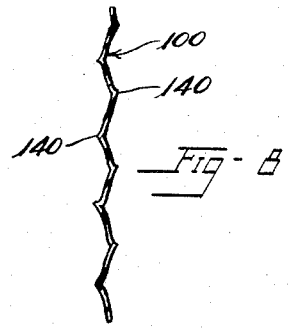
Figure 9:
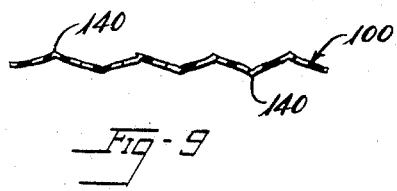
Figure 10:
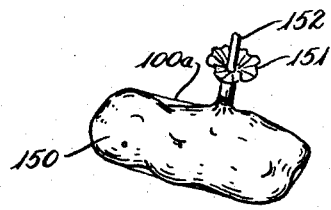
Figure 11:
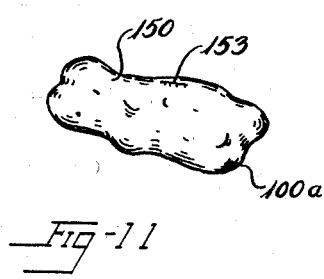

Figs. 8 and 9 are sectional views of the film of Fig. 7 taken on line 8—8 and 9—9 respectively;

Fig. 10 is a perspective view of an article of irregular shape enclosed in a sheet of the film of Fig. 7 with the edges of the sheet gathered or twisted about a tube which communicates with the space between said article and the wrapper film; and Fig. 11 is the same as Fig. 10 but showing the film in close association with the entire surface of the wrapped article.

The present invention is useful in simultaneously conveying and uniformly stretching films or sheets of rubber hydrochloride and other thermostretchable elastoplastic films, such as, for example, but without limitation, polyvinyl alcohol, nylon, etc. Such an embodiment of the invention is illustrated in Figs. 4, 5, 6, 7, 8 and 9 as will now be explained in reference to the commercially available transparent, colored or opaque rubber hydrochloride film being made by the process described in the Calvert Patent Number 1,989,632. Such films are usually about .001 inch in thickness but thinner or considerably thicker gauge film will be satisfactory for the present operation. The difficulty of stretching such films as set out in said Calvert Patent No. 1,989,632 is discussed at length in the first column of the R. C. Martin Patent Number 2,328,827 to which reference is made. Extremely thin films as for example .00075 to .0015 inch in thickness heretofore have been extremely difficult to stretch uniformly when heated, due to the fact that such films, when cast or calendered, are not uniform in thickness and when pulled, as by tentering devices, the thin areas localize the stretch. The present invention solves this problem by sandwiching the film to be stretched between two moving belts that are elastic and simultaneously stretch said belts in all directions imparting a corresponding stretch to the said film regardless of thin or tough areas that may be in the film. It is believed that applicant's method of stretching, now to be described in detail, has a slight but important molding effect on the film which results in a leveling off of the thick spots and filling in the thin ones.

Referring particularly to Figs. 4, 5 and 6, a sheet of film 100 to be stretched is led into the bite between two driven belts 101 and 102. Film 100 is heated by being passed over suitable heating rolls, not shown, just prior to the films entrance between belts 101 and 102 as is well understood in the art. In the case of rubber hydrochloride film, it is heated to approximately 200° F. at time of stretching and is delivered from the heating rolls to belts 101 and 102 at the same speed these belts are traveling at the first point of contact of the film with the belts. From this point until the film emerges from between the belts said belts grip the film therebetween, Belts 101 and 102 are composed of elastic material such as rubber and are molded with beaded edges 103, 104 and 105, 106 respectively. These edges are adapted to slide in the grooves of substantially C-shaped diverging rigid guide members 107 and 108 disposed at the edges of 101 and 102 as shown. Belts 101 and 102 when composed of rubber are preferably approximately 3/16 inch thick and the beads of sufficient thickness and shape to readily slide in said C guides. Applicant has found that by lubricating said guides with graphite that the belt edges slide in the guides without objectionable friction. It is to be understood, however, that the invention contemplates antifriction constructions for said guide channels, such as, for example, a series of roller bearings against which the edges 103, 104, 105 and 106 would run.

Belt 102 runs over driven drums 109 and 110 from drum 109 over a series of horizontal idler rollers 111 to drum 110. Rollers 111 are disposed in an arcuate path and are supported in suitable bearings in a side frame, the last mentioned bearing and side frame not being shown but are of a type common in mechanical devices and therefore a detailed description of them is considered to be unnecessary. As will be seen by reference to the Figs. 10 and 11, drums 109 and 110 are supported on upright members 112, 113 and 114, 115 respectively, bolted to a base 116. Belt 101 is mounted on driven drums 117 and 118 and travels from the bottom of drum 117 to the bottom of drum 118 normally in contact with belt 102. Members 107 and 108 are arranged to provide continuous diverging guides for said edges of the belts from just adjacent drums 109, 117 to adjacent drums 110 and 118 as will be seen by reference to Fig. 10.

Drums 109, 117, 110, 118 are supported on shafts 119, 120, 121, 122 respectively and are driven indirectly by sprocket chain 123 connected to a suitable source of power, not shown, and to a sprocket wheel 124 mounted on shaft 119. Shaft 119 rotates drum 109 and has mounted in driving relation therewith sprocket wheel 125 carrying sprocket chain 126 running from wheel 125 to a sprocket wheel 127 mounted on and driving shaft 120 which latter shaft drives drum 117. A sprocket wheel 128 is driven by shaft 119 and a smaller sprocket wheel 129 on shaft 121 is driven by a sprocket chain 130 mounted on said wheels 128 and 129. Drum 110 is driven by wheel 129 through shaft 121. Drum 118 is driven by shaft 122 by a sprocket wheel 131 and a sprocket chain 132 mounted on wheels 131 and 134.

It will now be seen that the sheet of film 100 will be drawn between and advanced with belts 101 and 102 with the weight of belt 101 over the film pressing the film against the surface of these latter belts. The guide members 107 and 108 receive the beaded edges 103, 105 and 104, 106 respectively and lead the edges of belts 101 and 102 progressively laterally outwardly as these belts run from between drums 109, 117 to between drums 110, 118 which results in a continuous gradual progressive stretch of the surface of belts 101 and 102 during their progress from drums 109, 117 to drums 110, 118. Referring now to the sprocket drives of these last mentioned drums, it is to be understood that drums 109 and 117 are driven at the same surface speed and that drums 110 and 118 are driven at the same surface speeds, but that the surface speed of drums 110 and 118 is faster than that of drums 109 and 117 resulting in stretching belts 101 and 102 longitudinally as they progress from drums 109, 117 to drums 110, 118. Said lateral and longitudinal stretch of said belts occur simultaneously. The strip of film 100 being heated as explained and made readily stretchable has imparted to it the same stretch, both in amount and condition of stretching, as the stretch to which belts 101 and 102 are subjected. This stretching of the film results from its frictional contact with the surfaces of belts 101 and 102. The stretching movement of the surface of these latter belts pressed firmly against the softened and easily stretched film is mechanically quite different from prior type methods of stretching said films in that the portion of film being stretched is grasped over its entire surface between two expanding surfaces that impart to the film the same expansion to which said expanding surfaces are subjected. Since the belts 101 and 102 are of substantial thickness and preferably molded, their stretch is substantially free of the localized stretch that has heretofore resulted in the extremely thin, soft film of irregular thickness.

The amount of stretch given film 100 may be as much as desired being limited only by the rupturing point of the film. The apparatus shown in Fig. 10 is adapted to stretch film approximately 60% in all directions. Obviously, this particular stretch could be substantially increased or decreased on a single unit similar to Fig. 10; however, if extreme stretches are desired, the film 100 may pass from one unit as shown in Fig. 10 directly into a second and a third etc. of larger but similar stretching units until the maximum stretch the film will stand is reached. The temperature of the film may be maintained in its travel through additional units by passing over heated rolls interposed between the additional stretching units, or by passing the film through heated chambers, or by any method found satisfactory. If the sheet of film 100 is substantially narrower than belts 101 and 102 it will be stretched in the same manner as the strip 100 which is illustrated as being of approximately the same width as the unstretched width of belts 101 and 102. These narrower sheets may be run through the apparatus of Fig. 10 and cooled and rolled on a drum and then reheated and again passed through the stretching apparatus until the desired stretch of the film has been obtained.

Referring again to Figs. 4, 5 and 6 guides 107a and 108a of the same construction as guides 107 and 108 are employed to guide edges 103, 104 and 105, 106 in their return courses to drums 117 and 109 respectively. Said guides are disposed relative to said drums so that the beaded edges of the belts will enter the guides regardless of the direction belts 101 and 102 are run.

After sheet 100 has been cooled, in any manner found satisfactory, it is rolled on a shell or drum for storage or handling in a further operation of the present invention which will now be described. In this further operation, the apparatus shown in Figs. 10, 11 and 12 is run in reverse to that described above and the stretched and cooled sheet 100 is run back through the apparatus whereby it is subjected to compression forces in all directions in the plane of said sheet. As the belts 101 and 102 travel from drums 118 and 110 to drums 117 and 109 respectively, they progressively shrink in the reverse manner that they were stretched when traveling in the opposite direction due to the elastic characteristic of the belts such shrinking would normally leave the surface of the belts smooth and unwrinkled. The cold sheet of film 100 sandwiched and gripped between said shrinking belts are incapable of comparable shrinkage of said belts and accordingly are forced into numerous small wrinkles 140. Since the wrinkling force is applied from all directions in the plane of the surface of sheet 100, the wrinkles form no pattern and sheet 100 emerges from between said belts at drums 117 and 109 in such wrinkled form that the sheet is extensible in all directions without stretching. In effect, the sheet 100 wrinkled as just explained provides a wrinkled or crimped sheet adapted for wrapping or packaging purposes but differing in the structure of its wrinking or crimping from crimped papers and the like heretofore known, in that the wrinkles of sheet 100 extend in all directions, whereas the crimps or wrinkles of the prior art extend in one direction only. The wrinkles of sheet 100 are illustrated in Figs. 7, 8 and 9 and the use of such sheet or material for packaging is illustrated in Figs. 10 and 11 to which reference is now made.

In Fig. 18 an irregularly shaped object 150, such as a potato is wrapped in wrinkled film 100a such as wrinkled sheet 100. Preferably the film is drawn snugly about the object 150 which can be done since the wrinkles 140 will straighten out permitting the film to form about the object being wrapped as though the film was stretchable. Applicant has found that the film wrinkled as explained can be wrapped about a sphere such as a round ball without causing additional wrinkles in the film, which is impossible with prior art non-stretchable films. In the case of the odd shaped object 150, applicant draws the film 100a thereabout snugly and gathers the edge 151 about a removable air-escape tube 152, after which a flow of hot air from any suitable source is directed onto the film 100a which, as will be understood by those familiar with the art, will cause film 100a to shrink and this results in the straightening out of all wrinkles 140 presenting a smooth wrap about object 150. Next, if desired, the escape tube 152 may be connected with a suitable vacuum line whereby the air between object 150 and film 100a is exhausted and the film drawn into close association with the object after which tube 152 may be partially removed and film 100a crimped and heat sealed as illustrated at 153, Fig. 19. This heat sealing may be accomplished by any type of heated pressure members or heat may be omitted and a sealant of suitable type may be applied to the edge portions of sheet 100a which will make a satisfactory seal when the sealant is pressed together as at 153 referred to above. After sealing at 153, tube 152 is removed.

Another embodiment of the invention is illustrated in Figs. 1, 2 and 3 wherein a plurality of molded stretchable endless V belts 201 and 202 run in sheaves on drums 209, 217, 210 and 218 as substitutes for belts 101 and 102 and drums 109, 117, 110 and 118 respectively. Belts 201 run from the top of drum 217 to the top of drum 218 in a converging direction and in like manner belts 202 run from drum 209 to drum 210. Magnets 203 are molded into belts 201 with an arcuate surface exposed and preferably extending a slight distance beyond the surface of the belts in which they are disposed. Magnets 203 are spaced at short uniform distances longitudinally of the belts 201 when the belts are molded. Belts 202 are provided with magnets 204 in the same manner and disposition as magnets 203 in belts 201. The magnets 203 are oppositely charged to magnets 204 and these magnets are so disposed in belts 201 and 202 which belts are so disposed relative to each other that their magnets normally contact the correspondingly disposed magnet of the opposite belt as shown in Fig. 3.

Belts 201 and 202 are subjected to divergence which corresponds to the lateral stretch of belts 101 and 102 and likewise to the same longiutdinal stretch. The sheet of film 100 is fed into the bite between belts 201 and 202 in the same condition and manner as described hereinabove relative to Fig. 10. The sheet 100 is gripped between magnets 203 and 204 and as belts 201 and 202 advance to drums 218 and 210 respectively, the sheet 100 is stretched between the gripping points of said magnets imparting a stretch to sheet 100 similar to the stretch imparted by the apparatus of Fig. 4 heretofore explained. The stretching operation of film 100 by the means of Figs. 1, 2 and 3 will be clearly understood by reference to the explanation of the operation of belts 101 and 102 in stretching sheet 100 and therefore further detailed description is unnecessary.

It will now be apparent that the stretching and wrinkling apparatus and method may be employed for repeated passes of stretched or wrinkled material. Thus the stretch may be increased or additional wrinkling effected. Or the invention may be employed to wrinkle such materials as foils or paper. For example, presently crepe paper is wrinkled in one direction only but if such creped paper was passed through applicant's apparatus so as to crowd the paper from all directions, it would become stretchable in all directions which would add to its usefulness in many wrapping operations.

The detailed description of the particular embodiments of the invention illustrated and described herein is not to be construed as limiting the invention thereto. The invention includes all features of patentable novelty residing in the foregoing description and the accompanying drawings.

I claim:

1. Apparatus for continuous simultaneous stretching in all directions in a given plane, a sheet of stretchable material which comprises two stretchable elastic driven endless belts mounted on and driven by two pairs of pulleys, the pulleys of each said pair having parallel axis and one pulley of each pair being disposed substantially directly over the other so that said belts run in direct contact with each other from one said pair of pulleys to the other, said belts having integral continuous thickened bead-like edges; non-parallel rigid grooved guide members disposed between said pairs of rolls; said beaded edge portions being disposed in said grooves in sliding relation therewith whereby the course of travel of said thickened edges from one pair of rolls to the other is defined.

2. Apparatus for continuous stretching simultaneously in all directions in a given plane, a sheet of stretchable material, said apparatus comprises two stretchable elastic driven endless belts mounted on and driven by two pairs of pulleys, said pairs being spaced a substantial distance apart, the pulleys of each said pair having parallel axis and one pulley of each pair being disposed closely spaced from the other pulley of the same pair so that said belts are in substantial contact between the rolls of each said pair, means comprising a series of belt support rollers defining an arcuate path along which said belts travel from one said pair of pulleys to the other, whereby said adjacent surfaces of said belts in said arcuate path are pressed forcibly together and thereby grip the surface of sheet material passing between said belts in said path; said belts having continuous normally parallel beaded edges formed integral therewith; non-parallel rigid guide members having substantially C-shaped grooves therein adapted to receive in sliding relation therewith said beaded edges and define the course of travel of said beaded edges in a non-parallel direction from one pair of pulleys to the other.

3. Apparatus for stretching sheet material, said apparatus comprises two stretchable elastic driven endless belts mounted on and driven by two pairs of pulleys, said pairs being spaced a substantial distance apart, the pulleys of each said pair being disposed closely spaced from the other pulley of the same pair so that said belts are in substantial contact between the rolls of each said pair, means comprising a series of belt support rollers defining an arcuate path along which said belts travel from one said pair of pulleys to the other, whereby said adjacent surfaces of said belts in said arcuate path are pressed forcibly together.

4. Apparatus for continuous stretching or wrinkling simultaneously in all directions in a given plane, a sheet of stretchable material, said apparatus comprises two stretchable elastic driven endless belts mounted on and driven by two pairs of pulleys, said belts having continuous normally parallel beaded edges formed integral therewith; non-parallel rigid stationary guide members having substantially C-shaped grooves therein adapted to receive and retain in sliding relation therewith said beaded edges whereby the path of travel of said beaded edges from one pair of pulleys to the other is determined.

5. Apparatus for continuous stretching simultaneously in all directions in a given plane, a sheet of stretchable material, said apparatus comprising two stretchable elastic driven endless belts mounted on and driven by two pairs only of pulleys, said pairs being spaced a substantial distance apart, the pulleys of each pair being disposed closely spaced from the other pulley of the same pair so that said belts are in substantial contact between the rolls of each said pair, means comprising a series of belt support rollers defining an arcuate path along which said belts travel from one said pair of pulleys to the other, whereby said adjacent surfaces of said belts in said arcuate path are pressed forcibly together and thereby grip the surfaces of sheet material passing between said belts in said path; said belts having continuous normally parallel edges; non-parallel guide members in guiding relation with said edges and defining the course of travel of said edges in non-parallel directions from one pair of pulleys to the other.

6. Apparatus for continuous stretching simultaneously in all directions in a given plane a sheet of stretchable material, said apparatus comprising two laterally and longitudinally stretchable elastic driven endless belts of greater width than the width of said material to be stretched; said belts being mounted on two pairs only of pulleys, said pairs of pulleys being spaced a substantial distance apart longitudinally of the belts, the axes of all the pulleys being parallel and the pulleys being so disposed that said belts having confronting surfaces that are in frictional contact with each other, said belts having continuous normally parallel edges; non-parallel guide members in guiding contact with said belt edges; means for driving pairs of pulleys at different ratio of surface speed; said belts being mounted on said pulleys so all of each said endless belts progressively pass between the rolls of each said pair of pulleys.

7. Apparatus for continuous stretching simultaneously in all directions in a given plane a sheet of stretchable material, said apparatus comprising, two pairs of parallel driven pulleys having belt-driving contact surfaces, the axially lengths of the belt contact surfaces on the pulleys of one said pair being shorter axially of the pulleys than on the pulleys of said other pair; a pair of elastic endless belts mounted on said pulleys in driven relation therewith, said pulleys being so disposed relative to each other that said belts travel from one pair of rolls to the other with confronting surfaces; support means for said belts disposed along the belts said travel of said confronting surfaces, said support means being disposed in an arcuate path whereby said confronting surfaces are pressed into frictional contact, said belts in their initial shape and before mounting on said pulleys having parallel edges and in their operative mounted position on said pulleys having non-parallel edges.

References Cited in the file of this patent

UNITED STATES PATENTS

| | | |
|---|---|---|
| 2,011,553 | Land | Aug. 13, 1935 |
| 2,618,012 | Milne | Nov. 18, 1952 |
| 2,702,406 | Reed | Feb. 22, 1955 |